(12) United States Patent
Qi et al.

(10) Patent No.: US 7,805,603 B2
(45) Date of Patent: Sep. 28, 2010

(54) APPARATUS AND METHOD OF PROTECTING MANAGEMENT FRAMES IN WIRELESS LAN COMMUNICATIONS

(75) Inventors: Emily H Qi, Portland, OR (US); Jesse Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1464 days.

(21) Appl. No.: 10/803,697

(22) Filed: Mar. 17, 2004

(65) Prior Publication Data
US 2005/0207581 A1 Sep. 22, 2005

(51) Int. Cl.
*H04L 29/06* (2006.01)
(52) U.S. Cl. .................... 713/151; 713/150; 713/152
(58) Field of Classification Search ............. 370/389; 455/410, 411; 713/150–153
See application file for complete search history.

(56) References Cited

U.S. PATENT DOCUMENTS

| | | | |
|---|---|---|---|
| 2004/0103282 A1* | 5/2004 | Meier et al. .................. 713/171 |
| 2004/0136339 A1* | 7/2004 | Wentink ....................... 370/329 |
| 2005/0141498 A1* | 6/2005 | Cam Winget et al. ....... 370/389 |

OTHER PUBLICATIONS

How 802.11 Wireless Works' Online! Mar. 28, 2003, pp. 1-12, retrieved from the internet on Jun. 14, 2005: www.microsoft.com. XP002331782.

Aboba, "IEEE 802.1X Pre-Authentication" Online! Jul. 11, 2002, retrieved from the internet on Jun. 14, 2005: www.ieee802.org.

Arbaugh, "Your 802.11 Wireless Network has no clothes" Online! Mar. 30 2001, retrieved from the Internet on Jun. 14, 2005: www.cs.umd.edu/{waa/wireless.pdf> XP002331784.

Search Report and Written Opinion.

"How 892.11 Wireless Works", http://go.microsoft.com/fwlink/?linkid=12735, Microsoft Corporation, updated on Mar. 28, 2003.

Kanggui, Wang, et al., "An Security Analysis of Robust Security networks based IEEE802.11", Computer Technologies and Application, 2002, pp. 4 pgs.

in, Huang, et al., "The Study of attacks on WLAN Security Mechanism", Net Security Technologies and Application, 2003, 4 pgs.

Qi, Emily H., et al., "Apparatus and Method of Protecting Management Frames in Wireless LAN Communications", Chinese Office Action with English Translation mailed Jul. 25, 2008, 29 pgs.

PCT/US2005/008605 International Search Report and Written Opinion, Jun. 28, 2005, 12 pages.

* cited by examiner

*Primary Examiner*—Temica M Beamer
(74) *Attorney, Agent, or Firm*—Cool Patent, P.C.; Joseph P. Curtin

(57) ABSTRACT

Briefly, in accordance with one embodiment of the invention, an apparatus comprising Management Frames utilized in wireless communications associated with the apparatus, and the Management Frames being protection-capable or non-protection-capable and wherein the Management Frames indicate whether or not they are protection-capable.

33 Claims, 7 Drawing Sheets

APPARATUS AND METHOD OF PROTECTING MANAGEMENT FRAMES IN WIRELESS LAN COMMUNICATIONS

BACKGROUND

Wireless networking hardware requires the use of underlying technology that deals with radio frequencies as well as data transmission. The most widely used standard is 802.11 produced by the Institute of Electrical and Electronic Engineers (IEEE). This is a standard defining all aspects of Radio Frequency Wireless networking. A subset of 802.11 is 802.11 k—Radio Resource Management. This standard focuses on the two key WLAN elements: access points (AP) and PC Cards.

Within this 802.11 standard, Management Frames, including Action Frames are used extensively; currently there are no security mechanisms to protect these Management Frames in the IEEE 802.11 standard. Thus, there is a continuing need for better ways to protect Management Frames and thus enable more secure, efficient and reliable wireless networking.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
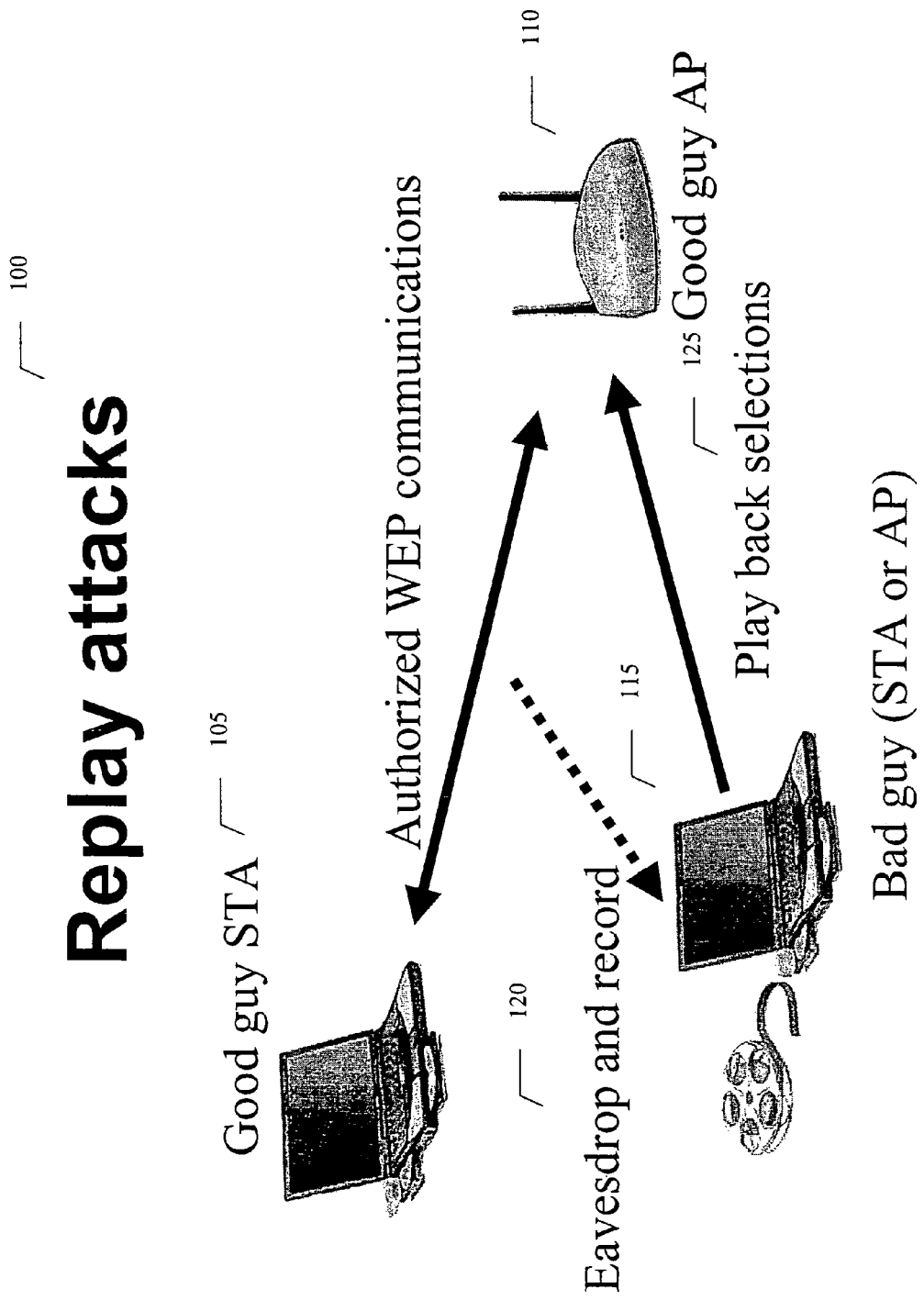
FIG. 1 illustrates a prior art wireless network subject to replay attacks.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

The goal of 802.11k is to make measurements from Layers 1 and 2 of the OSI protocol stack—the physical and data link layers—available to the upper layers. This means that it is expected that the upper layers can and will make decisions about the radio environment and what can be accomplished in that environment. One feature 802.11k will enable is better traffic distribution. Normally, a wireless device will connect to whatever AP gives it the strongest signal. This can lead to overload on some APs and underload on others, resulting in lowered overall service levels.

The 802.11k standard will allow network management software to detect this situation and redirect some of the users to underutilized APs. Although those APs have weaker signals, they are able to provide greater throughput. This will produce higher speeds for both those on the original AP and the redirected users.

The Action Frame, a class 1 IEEE 802.11 Management Frame, is used to exchange radio resource measurement, radio resource requirement, network information, and network optimization control in IEEE 802.11 amendments (11k, 11h, 11e, and 11i). Action Frames contain valuable radio resource and network information and are subject to forgery. Forged Action frame messages can lead to poor performance or ignoring valid messages. However, the IEEE 802.11 standard and its amendments have defined no mechanism to protect Management Frames, such as Action Frames, from forgery.

As can be seen in FIG. 1, shown generally as 100, wireless networks without the capabilities provided by the present invention are subject to replay attacks. In this example, "good guy" wireless station (STA) 105 is in wireless communication with "good guy" access point (AP) 110. Without the apparatus, systems and methods of the present invention, "bad guy" STA or AP 115 can eaves drop and record 120 the wireless communication between AP 110 and STA 105 and playback selections 125 to AP 115.

Figure 2:
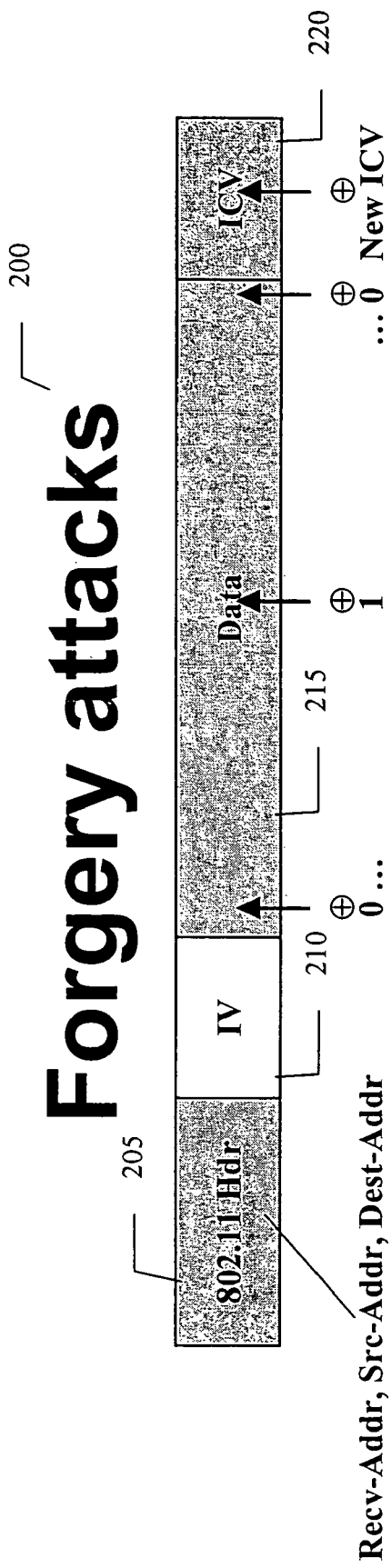
FIG. 2 illustrates a prior art wireless network subject to forgery attacks.

FIG. 2 illustrates yet another problem with existing wireless networks using only Wireless Equivalent Privacy (WEP). Shown generally as 200, forgery attacks are illustrated with 802.11 header at 205, IV 210, Data 215 and ICV at 220. One possible attack, caused by the fact that Recv-Addr, Src-Addr, Dest-Addr are all unprotected, can be on packets from a STA to the AP, corrupting the Dest-Addr and the AP decrypting data and sending it to the forged destination. Another possible attack can be to create a blank message with the same number of data bytes and flip some bits and compute the ICV; XOR resulting bit-flipped message+ICV into captured message.

One embodiment of the present invention provides a mechanism to protect Management Frames, such as Action Frames, and enables Wireless Stations (STAs) to exchange Management Frames, such as Action Frames, in a secure manner. In this preferred embodiment of the present invention a new attribute of the Action Frame is created and depends on whether or not the Action Frame can be protected. This result is two classes of Action Frames: protection-capable frames and non-protection-capable Frames. By default, all Action Frame are non-protection-capable, for backward compatibility. Non-protection-capable Actions Frames will be "normal" Action Frames—protection never applied. Protection-capable Action Frames can be protected and will be protected if local policy requires. For example, if the Basic Service Set (BSS) policy does not require protected Action Frames, then STAs shall send all Action Frames without protection, including all protection-capable Action Frames.

If the BSS policy requires protected Action Frames, then a STA shall protect all protection-capable Action Frame. The STA shall not send protection-capable Action Frames at all if the peer has not agreed to protection. If the BSS policy requires protected Action Frames, then a STA shall discard any unprotected protection-capable Action Frame it receives, which includes those received before the IEEE 802.11i 4-Way Handshake completes. A STA shall never try to protect a non-protection-capable Action Frame it sends and shall discard any it receives protected.

Further, a preferred embodiment of the present invention provides a new Robust Security Network (RSN) Capabilities bit "Protected Action Frames" to be added for Action Frame protection negotiation. Beacon/Probe Response source sets a bit to indicate that protection is required for all protection-capable Action Frames.

Beacon/Probe Response source clears this bit to indicate it does not support Action Frame protection or that protection is disabled. Responding STAs set the bit as the Beacon/Probe Response source sets it if they support Protected Actions Frames and clear it otherwise.

Figure 3:
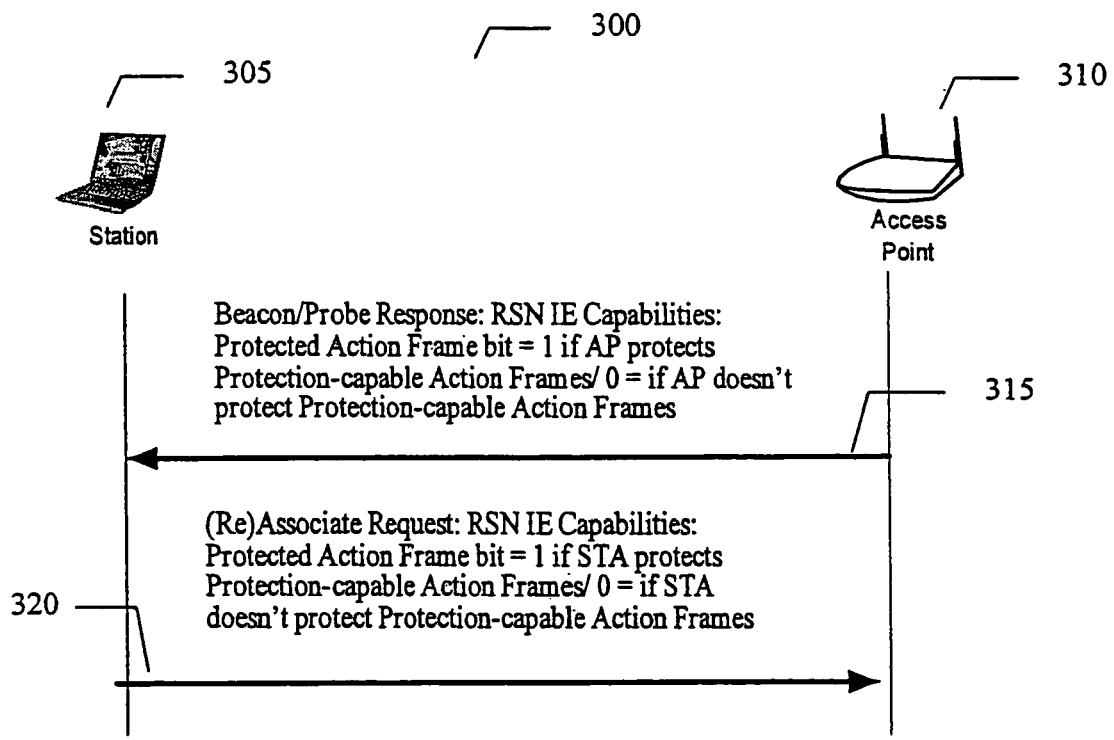
FIG. 3 is a diagram of the negotiation between an access point (AP) and wireless station (STA) which utilizes the protection-capable and non-protection-Capable mechanisms of the present invention.

Turning now to FIG. 3, shown generally as 300, is an illustration of the negotiation details. In this preferred embodiment, access point (AP) 310 is in wireless communication with wireless station (STA) 305. The initial communication 315 from AP with Beacon/Probe Response: RSN IE capabilities, provides that Protection Action Frame bit=1 if AP 310 protects protection-capable Action Frames; and Protection Action bit=0 if AP 310 does not protect protection-capable Action Frames.

Response 320 Association Request with RSN IE capabilities, provides that Protection Action bit is set as in the Beacon or Probe Response if STA 305 protects protection-capable Action Frames and sets the Protection Action bit=0 otherwise.

An example RSN IE Protected Action Frame Subfield Specified BSS policy may be:

AP sets to 0 if Protected Action Frames not supported/enabled

AP sets to 1 if Protected Action Frames supported and enabled

STA sets to 0 if doesn't support Protected Action Frames

STA sets to value set by AP if it supports Protected Action Frames

However, it is understood that numerous policies can be implemented in the present invention.

Figure 4:
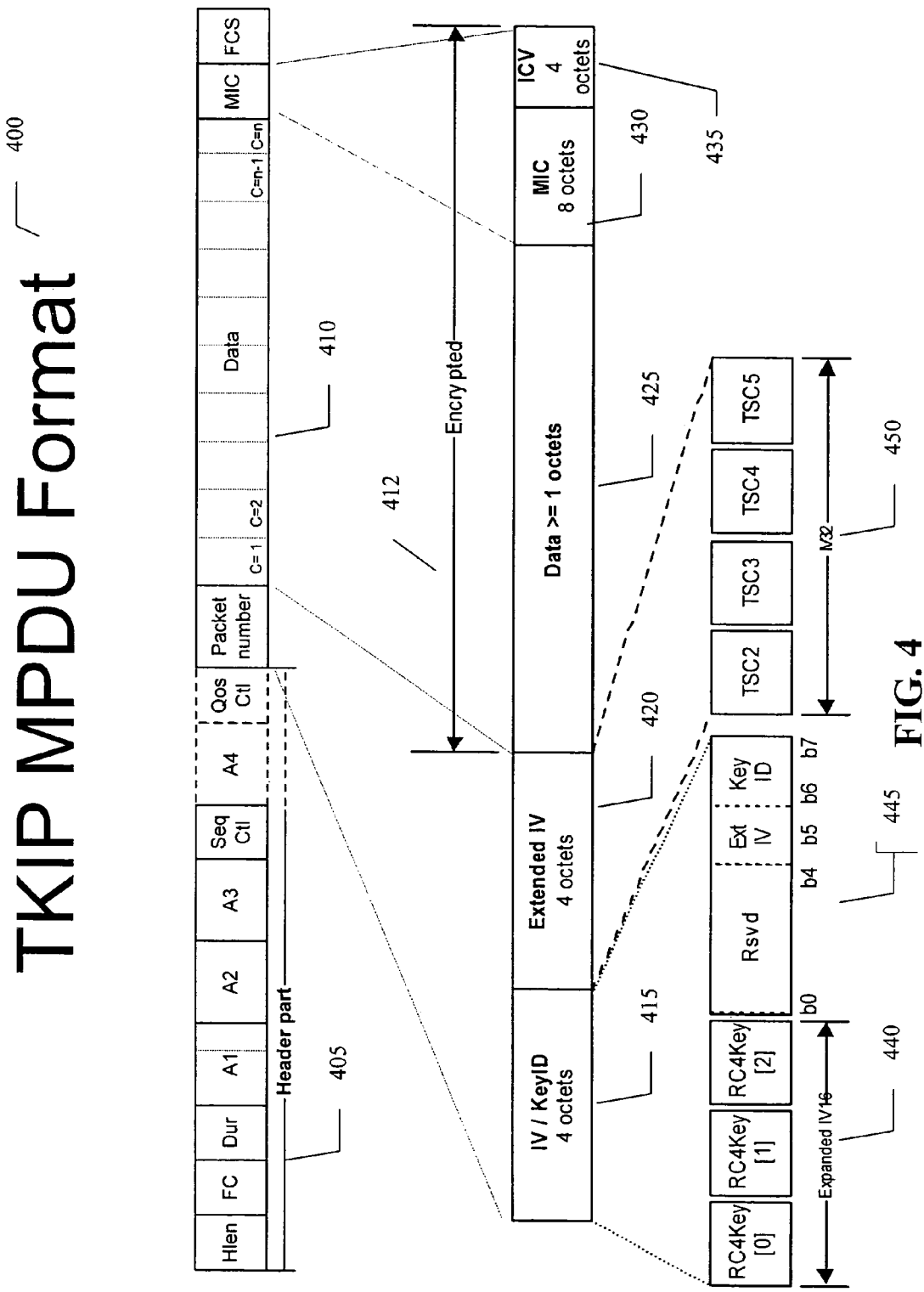
FIG. 4 illustrates the TKIP MPDU Format utilized in one preferred embodiment of the present invention.

Once STAs negotiation is finished, the protection-capable Action Frame is protected in the same ways as an ordinary data MPDU if local policy requires the protection-capable Action Frame to be protected. FIG. 4, shown generally as 400, illustrates the TKIP MPDU Format, with header part 405 and data frames 410. An expanded view of data frames 410 is shown by reference numerals 415-435, with IV/KeyID (4 octets) 415, Extended IV (4 octets) 420, Data (>=1 octets) 425, MC (8 octets) 430 and ICV (4 octets) 435. The encrypted portion 412, includes Data 425, MC 430 and ICV 435. An expanded view of IV/Key ID 415 is illustrated at 440 and 445; and an expanded view of Extended IV is illustrated at 450.

Figure 5:
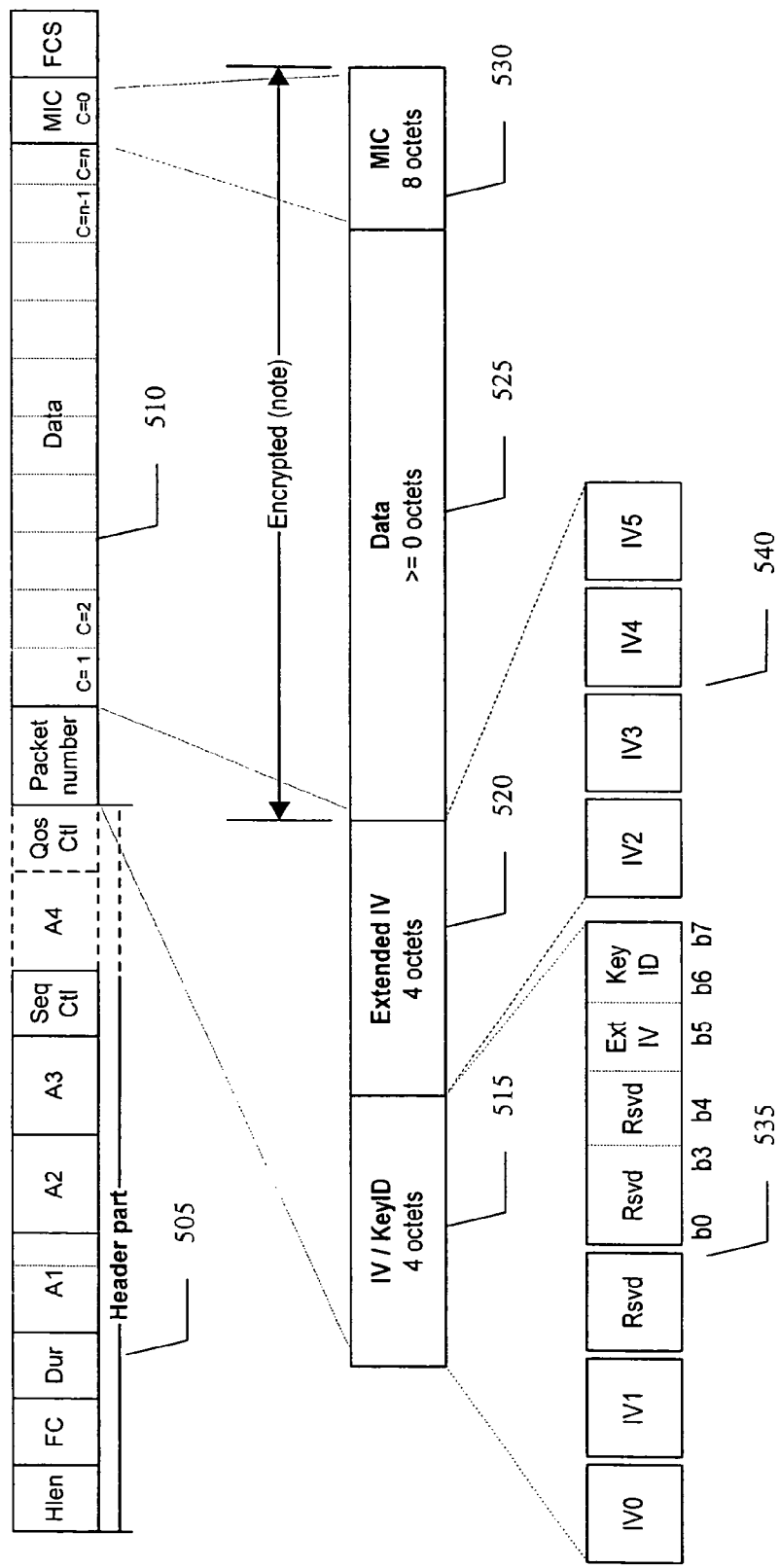
FIG. 5 illustrates the format of the CCMP protocol construction to protection-capable Action Frames of one preferred embodiment of the present invention.

Another method of protection is accomplished by applying the IEEE 802.11i CCMP protocol construction to protection-capable Action Frames. FIG. 5, shown generally as 500, illustrates the CCMP MPDU Format of one preferred embodiment of the present invention. Header part is illustrated at 505 and data portion at 510. The data portion 510 is expanded to show IV/Key ID (4 octets) 515, Extended IV (4 octets) 520, Data (Octets >=0) 525, and MIC (8 octets) 530. IV/Key ID 515 is shown expanded at 535 and Extended IV is expanded at 540.

The CCMP Message Integrity Code protects the Action Frame from undetected forgery. The CCMP Sequence Number protects the Action Frame from replay. The CCMP encryption scheme maintains the Action Frame payload as confidential. Sender's Pairwise Temporal Key protects unicast Action Frame and Sender's Group Temporal Key is used to protect broadcast/multicast Action Frame. An important benefit of the present invention allows the same keys that are used for data and thus no additional key management scheme required.

Figure 6:
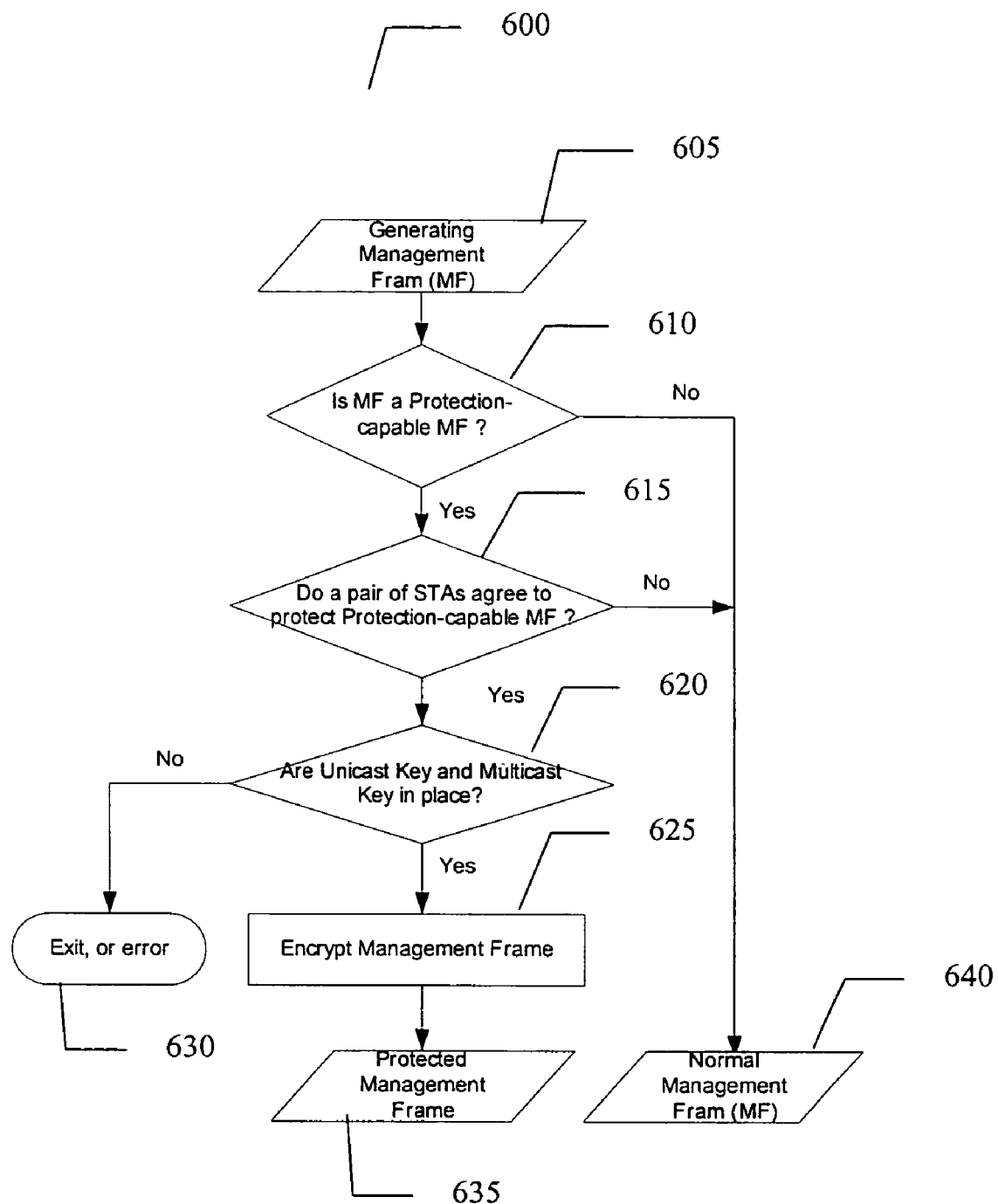
FIG. 6 is a flow chart of the procedure for transmitting from the wireless station (STA)

FIG. 6, at 600, is a flow chart of the procedure for transmitting from a wireless station (STA). At 605 the Management Frame is generated and at 610 the determination as to whether or not the Management Frame is protection-capable is made. If it is not protection-capable, the normal Management Frame is transmitted at 640. If the Management Frame is protection-capable, at 615 it is determined if a pair of STAs agree to protect the protection-capable Management Frame. If no, at 640 again the normal Management Frame is sent. If yes, at 620 the determination as to whether or not the Unicast Key and Multicast key are in place is made. If no, at 630 there is an error and exiting occurs. If yes, then encryption of the Management Frame takes place at 625, resulting in a protection Management Frame at 635.

Figure 7:
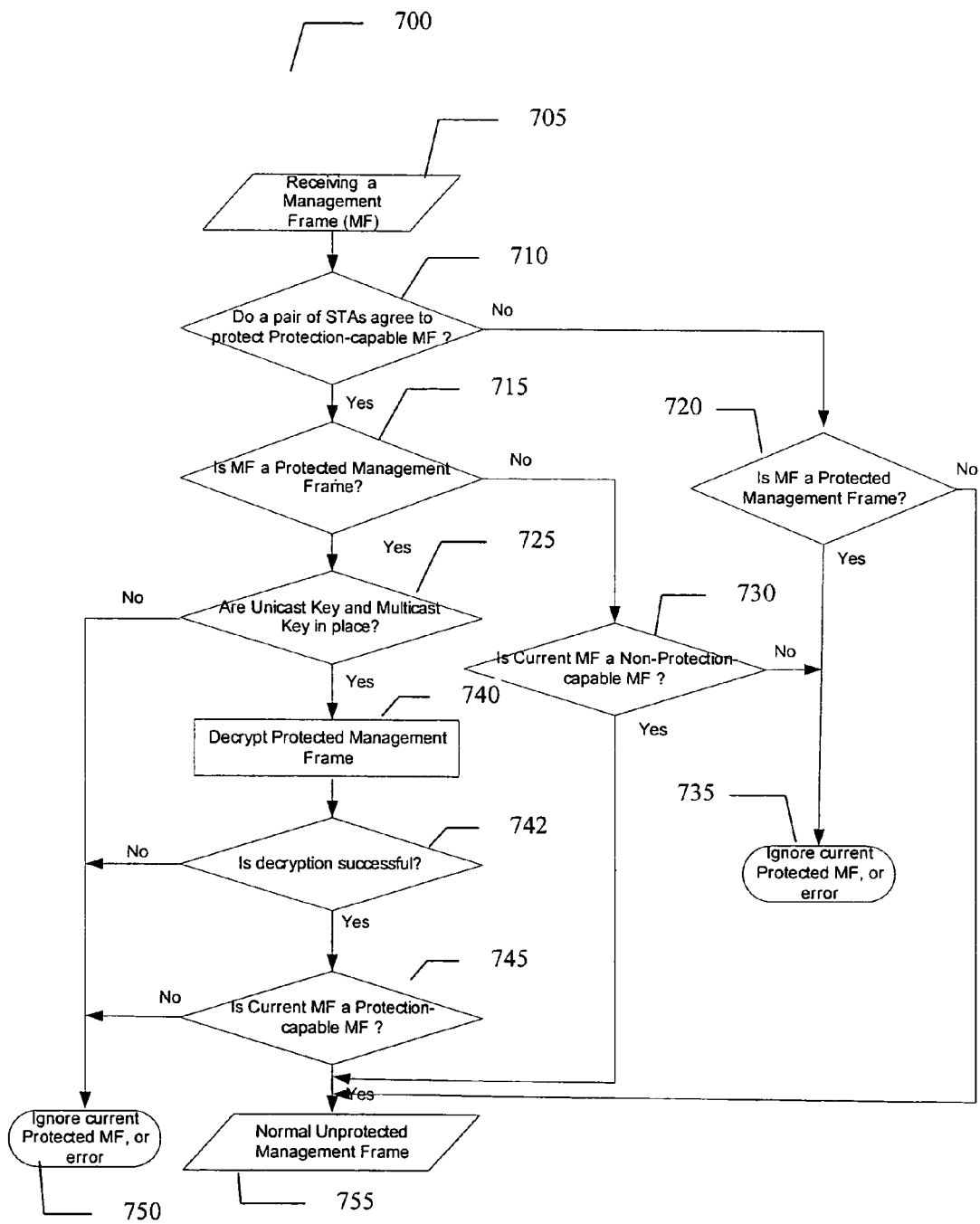
FIG. 7 is a flow chart of the procedure of receiving at the STA.

FIG. 7, at 700, is a flow chart of the procedure of receiving at the STA. At 705 receipt of a Management Frame occurs at a STA. At 710 it is determined if a pair of STAs agree to protect the protection-capable Management Frame. If no, the determination is made at 720 as to whether or not the Management Frame is a protected Management Frame. If yes, at 735 the current protected Management Frame is ignored or an error occurs. If yes at 710, then it is determined at 715 as to whether or not the Management Frame is a protected Management Frame. If no, at 730 it is determined if the current Management Frame is a non-protection capable Management Frame. If yes, than it is received as a normal unprotected Management Frame. If yes at 715, than at 725 the determination is made as to whether or not the Unicast Key and Multicast Key are in place. If no, than at 750, the protected Management Frame is ignored or an error occurs. If yes, at 725 the protected Management Frame is decrypted at 740.

Then, at 742, the decryption result is checked to see if it was successful. If the decryption failed for any reason, e.g., a message integrity or message sequencing error, then the frame is ignored or an error occurs. If the decryption succeeds, at 745 the determination is made as to whether or not the current Management Frame is a protection-capable Management Frame. If no at 745, than at 750 the protected Management Frame is ignored or an error occurs. If yes at 745, than it is a normal unprotected Management Frame at 755.

Thus, the present invention as articulated above describes an apparatus comprising Management Frames utilized in wireless communications (such as 802.11) associated with the apparatus, and the Management Frames being protection-capable or non-protection-capable and wherein said Management Frames indicate whether or not they are protection-capable. In one preferred embodiment of the present invention at least one of the Management Frames may be an Action Frame and the wireless communications can further include a Robust Security Network (RSN) Capabilities bit to be added for Action Frame protection negotiation and wherein the Action Frame protection negotiation may be provided by a Beacon/Probe Response source setting the RSN bit to indicate that protection is required for all protection-capable Action Frames.

If the RSN Capabilities bit is set to protection-capable, the Action Frames may be protected by applying the IEEE 802.11i CCMP protocol construction or the IEEE 802.11i TKIP protocol construction to the protection-capable Action Frames. Further, the CCMP protocol may use CCM to encrypt the Management Frame payload and to protect selected Management Frame header fields from modification. The aforementioned apparatus may be a pair of wireless stations (STA) and wherein at least one of the pair of wireless stations (STA) may be an access point (AP).

In yet another embodiment of the present invention is provided a method of protecting Management Frames in wireless communications, comprising establishing the Management Frames as protection-capable or non-protection-capable, and protecting the Management Frames if the Management Frames are protection-capable. The step of protecting the Management Frames may further include adding a Robust Security Network (RSN) Capabilities bit to the Management Frames for Management Frame protection negotiation, wherein if the RSN Capabilities bit is set to protection-capable, the Management Frames may be protected by applying a protection protocol to the protection-capable Management Frames. The Management Frame protection negotiation may be provided by a Beacon/Probe Response source setting the RSN bit to indicate that protection is required for all protection-capable Action Frames. The protection protocol may be the IEEE 802.11i CCMP protocol construction or the IEEE 802.11i TKIP protocol construction. In one preferred embodiment of the present invention at least one of the Management Frames may be an Action Frame and wherein if the RSN Capabilities bit is set to protection-capable, the Management Frames may be protected by applying to the protection-capable Action Frames. The aforementioned CCMP protocol may use CCM to encrypt the Management Frame payload and to protect selected Management Frame header fields from modification. Lastly, the TKIP protocol may use RC4 to encrypt the Management Frame payload and may use Michael, which is TKIP's message integrity algorithms, to protect selected Management Frame header fields from modification.

In yet another preferred embodiment of the present invention is provided an article comprising a storage medium having stored thereon instructions, that, when executed by a computing platform, establishes, in a wireless communication environment, protection-capable and non-protection-capable Management Frames, the protection-capable Management Frames being protected. Further, the protection-capable Management Frames being protected may be protected by adding a Robust Security Network (RSN) Capabilities bit to the Management Frames for Management Frame protection negotiation, wherein if the RSN Capabilities bit is set to protection-capable, the Management Frames may be protected by applying a protection protocol to the protection-capable Management Frames. The Management Frame protection negotiation may provided by a Beacon/Probe Response source setting the RSN bit to indicate that protection is required for all protection-capable Action Frames and the protection protocol may be the IEEE 802.11i CCMP or TKIP protocol construction.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
   Management Frames utilized in wireless communications associated with said apparatus; and
   said Management Frames being protection-capable or non-protection-capable and wherein said Management Frames indicate whether or not they are protection-capable based on a state of a Robust Security Network (RSN) Capabilities bit;
   wherein if the state of said RSN Capabilities bit is set to protection-capable, said Management Frames are protected by applying an IEEE 802.11i CCMP protocol-based encryption technique to said protection-capable Management Frames.

2. The apparatus of claim 1, wherein at least one of said Management Frames comprises an Action Frame.

3. The apparatus of claim 2, wherein said RSN Capabilities bit provides a protection negotiation capability to the Action Frame.

4. The apparatus of claim 3, wherein said Action Frame protection negotiation is provided by a Beacon/Probe Response source setting the state of said RSN Capabilities bit to indicate that protection is required for all protection-capable Action Frames.

5. The apparatus of claim 3, wherein if the state of said RSN Capabilities bit is set to protection-capable, said Action Frame is protected by applying an IEEE 802.11i TKIP protocol-based encryption technique to said protection-capable Action Frame.

6. The apparatus of claim 1, wherein said CCMP protocol-based encryption technique uses CCM to encrypt the Management Frame payload and to protect selected Management Frame header fields from modification.

7. The apparatus of claim 1, wherein said apparatus comprises a pair of Wireless stations (STA).

8. The apparatus of claim 7, wherein at least one of said pair of wireless stations (STA) comprises an access point (AP).

9. The apparatus of claim 5, wherein said TKIP protocol-based encryption technique uses RC4 to encrypt the Management Frame payload and uses Michael to protect selected Management Frame header fields from modification.

10. The apparatus of claim 5, wherein said apparatus comprises a pair of wireless stations (STA).

11. The apparatus of claim 10, wherein at least one of said wireless stations (STA) comprises an access point (AP).

12. The apparatus of claim 7, wherein one of the pair of STAs sourcing a Beacons and Probe Response, said STA sourcing Beacons and Probe Responses setting the state of the RSN Capabilities bit to 0 if said protected Management Frames are not supported/enabled and setting the state of the RSN Capabilities bit to 1 if said protected Management Frames are supported and enabled; the other of the pair of STAs responding by setting the state of the RSN Capabilities bit to 0 if the responding STA does not support protected Management Frames; and said responding STA setting the state of the RSN Capabilities bit to 1 if the responding STA supports protected Management Frames.

13. The apparatus of claim 1, wherein said wireless communications comprises an 802.11-based wireless LAN.

14. A method of protecting Management Frames in wireless communications, comprising:
   determining whether said Management Frames are protection-capable or are non-protection-capable; adding a Robust Security Network (RSN) Capabilities bit to said Management Frames if the Management Security Frames are protection-capable, a state of the RSN Capabilities indicating whether the Management Security Frames are set to protection-capable; and
   protecting the Management Frames for Management Frame protection negotiation by applying an IEEE 802.11i protocol-based encryption technique to the protection-capable Management Frames if the state of said RSN Capabilities bit is set to protection-capable.

15. The method of claim 14, wherein said Management Frame protection negotiation is provided by a Beacon/Probe Response source setting the state of said RSN bit to indicate that protection is required for all protection-capable Action Frames.

16. The method of claim 14, wherein at least one of said Management Frames comprises an Action Frame.

17. The method of claim 14, wherein if the state of said RSN Capabilities bit is set to protection-capable, said Management Frames are protected by applying an IEEE 802.11i TKIP protocol-based encryption technique to said protection-capable Management Frames.

18. The method of claim 14, wherein if the state of the RSN Capabilities bit is set to protection-capable, the Management Frames are protected by applying an IEEE 802.11i CCMP protocol-based encryption technique to the protection-capable Management Frames, said CCMP protocol-based encryption technique using CCM to encrypt the Management Frame payload and to protect selected Management Frame header fields from modification.

19. The method of claim 17, wherein said TKIP protocol-based encryption technique uses RC4 to encrypt the Management Frame payload and uses Michael to protect selected Management Frame header fields from modification.

20. The method of claim 14, wherein said wireless communications comprises wireless communications between a pair of wireless stations (STA), one which comprises an access point (AP).

21. The method of claim 20, wherein one of the pair of STAs comprising a sourcing STA that sets the state of the RSN Capabilities bit to 0 if said protected Management Frames are not supported/enabled; said sourcing STA setting the state of the RSN Capabilities bit to 1 if said protected Management Frames are supported and enabled; the other of the pair of STAs responding by setting the state of the RSN Capabilities bit to 0 if the responding STA does not support protected Management Frames; and said responding STA setting the state of the RSN Capabilities bit to 1 if the responding STA supports protected Action Frames.

22. The method of claim 14, wherein said wireless communications comprises an IEEE 802.11-based wireless LAN.

23. An article comprising a storage medium having stored thereon instructions, that, when executed by a computing platform, establishes, in a wireless communication environment, protection-capable and non-protection-capable Management Frames, said protection-capable Management Frames being protected;
wherein said protection-capable Management Frames are protected by adding a Robust Security Network (RSN) Capabilities bit to said Management Frames for Management Frame protection negotiation based on a state of the RSN Capabilities bit, wherein if the state of said RSN Capabilities bit is set to protection-capable, said Management Frames are protected by applying an IEEE 802.11i CCMP protocol-based encryption technique for an IEEE 802.11i TKIP protocol-based encryption technique to said protection-capable Management Frames.

24. The article of claim 23, wherein said Management Frame protection negotiation is provided by a source of a Beacon/Probe Response setting the state of said RSN Capabilities bit to indicate that protection is required for all protection-capable Action Frames.

25. The article of claim 23, wherein at least one of said Management Frames comprises an Action Frame.

26. The article of claim 23, wherein said CCMP protocol-based encryption technique uses CCM to encrypt the Management Frame payload and to protect selected Management Frame header fields from modification, or uses the TKIP protocol-based encryption technique which uses RC4 to encrypt the Management Frame payload and Michael to protect selected Management Frame header fields from modification.

27. The article of claim 23, wherein said wireless communications comprises an IEEE 802.11-based wireless communications between a pair wireless stations (STA), one of which comprises an access point (AP).

28. A system to protect Action Frames in Wireless LAN Communications, comprising:
a first wireless station (STA); and
a second STA in communication with said first STA, said communication comprising non-protection-capable Action Frames and protection-capable Action Frames;
wherein if the wireless communication requires protected Action Frames, then said first or said second STA discards any unprotected protection-capable Action Frame it receives, and wherein the discard of any unprotected protection-capable Action Frames includes those received before an IEEE 802.11i-based 4-Way Handshake completes.

29. The system of claim 28, wherein if it is desired not to protect Action Frames, then the first and second STAs send all Action Frames without protection, including all protection capable Action Frames.

30. The system of claim 28, wherein if it is desired to protect Action Frames, then a STA protects all protection-capable Action Frames, said protection provided by adding a Robust Security Network (RSN) Capabilities bit to said Action Frames for Action Frame protection negotiation, wherein if a state of said RSN Capabilities bit is set to protection-capable, said Action Frames are protected by applying a CCMP protocol-based encryption technique that uses CCM to encrypt the Action Frame payload and to protect selected Action Frame header fields from modification, or by applying the TKIP protocol-based encryption technique that uses RC4 to encrypt the Action Frame payload and Michael to protect selected Action Frame header fields from modification.

31. The system of claim 28, where said first STA does not send protection-capable Action Frames at all if said second STA has not agreed to protection.

32. The system of claim 28, wherein neither said first nor said second STA attempt to protect non-protection-capable Action Frames the STA sends and discards any non-protection-capable Action Frames the STA receives protected.

33. The system of claim 28, further comprising a third STA in communication with said second STA.

* * * * *